Figure 1:
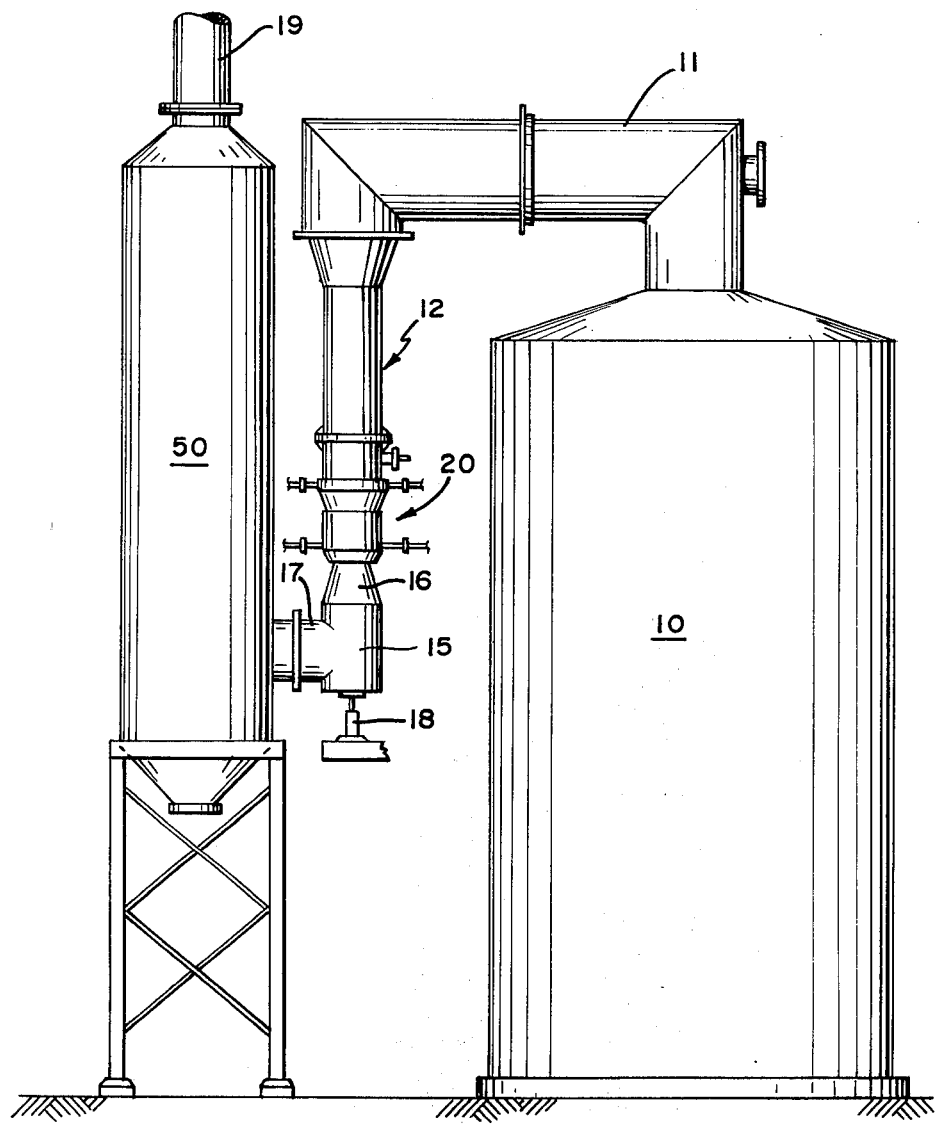

United States Patent [19]

Baturay et al.

[11] 3,877,488
[45] Apr. 15, 1975

[54] VENTURI SCRUBBER EXPANSION JOINT
[75] Inventors: Allen Baturay, Foster City, Calif.; Harold W. Richards, Westport, Conn.
[73] Assignee: Dorr-Oliver Incorporated, Stamford, Conn.
[22] Filed: Jan. 2, 1973
[21] Appl. No.: 320,434

[52] U.S. Cl. ................. 138/44; 285/11; 137/253; 137/254
[51] Int. Cl. ............................ F15d 1/02
[58] Field of Search .......... 285/10, 11; 137/247.11, 137/247.25, 251, 253, 254; 138/44

[56] References Cited
UNITED STATES PATENTS

| | | | |
|---|---|---|---|
| 725,937 | 4/1903 | Craig | 285/10 |
| 1,005,751 | 10/1911 | Schweitzer | 285/10 |
| 1,634,982 | 7/1927 | Corbett | 285/10 X |
| 3,009,716 | 11/1961 | Bradfute | 285/10 X |
| 3,075,753 | 1/1963 | Akin | 285/11 X |
| 3,368,578 | 2/1968 | Long | 137/251 |

*Primary Examiner*—Harold W. Weakley
*Attorney, Agent, or Firm*—H. M. Snyder; Burtsell J. Kearns; Theodore M. Jablon

[57] ABSTRACT

A water-seal expansion joint is located proximate the throat of a venturi scrubber and a flow of sealant water is permitted into the venturi throat region.

4 Claims, 3 Drawing Figures

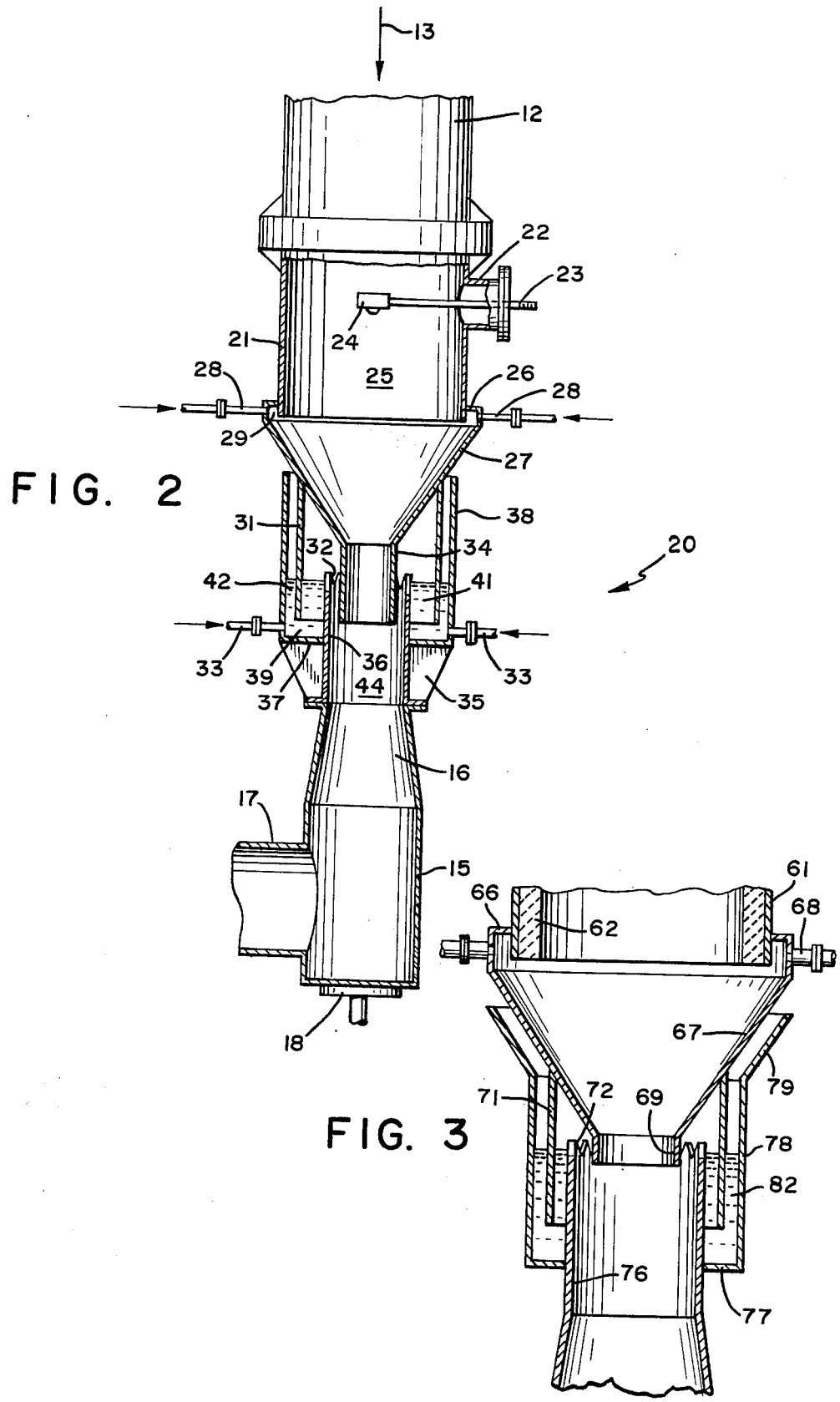

VENTURI SCRUBBER EXPANSION JOINT

This invention is directed to an improved water-seal expansion joint used in conjunction with a venturi scrubber.

The venturi scrubber is an effective device for separating particulate solid matter from gases. In this device, flowing gas, often at elevated temperature, with entrained particulate matter therein is exposed to a water spray in or adjacent to a venturi throat. The high velocity of gases in the venturi throat atomizes the water spray in the vicinity of the venturi throat into droplets of extremely fine size. The high relative velocity of solid particles and water spray droplets, and the turbulent zone following the venturi throat, insure a high incidence of contact between solid particles and spray droplets. The water droplets entrap the solid particles and coalesce on the conduit walls and run off for disposal separately from the gases. Venturi scrubbers of the type just described may be oriented in either a vertical or a horizontal position, but it is often convenient in view of space requirements and for other reasons to install the venturi scrubber in a vertical position.

It is well known that conduits for conducting volumes of hot gas must be designed to accommodate the expansion and contraction which occurs on heating and cooling. Thus, provision must be made for the required expansion "room" and this may be done by employing special convolutions of the conduit with ball and socket joints, by telescoping segments or by bellows-type expansion joints.

In cases where the venturi scrubber is installed in a vertical position, it has been necessary to make provision for expansion and contraction in the vertical direction. In the past, a bellows-type expansion joint, made of stainless steel, has been provided in the vertical conduit. This device functioned in a generally satisfactory manner, but it was found that the bellows required too frequent replacement due to the wet, corrosive, high temperature conditions in which it was required to operate. Shut-downs for replacement were necessarily costly. Another device which has been used in response to this problem, is a water-seal expansion joint. In this device, the lower end of a down-coming conduit section is immersed in an annular water-filled trough fixed on the end of, and in surrounding relation to, the adjoining conduit section. The conduit sections thus do not touch at the joint and the water in the trough seals the joint and is sufficiently deep to accommodate the movement of the conduits which occurs upon expansion and contraction. The outer wall of the trough is higher than the inner wall so that fluctuations in gas pressure can be sustained without break in the seal. Thus, if the pressure in the conduit increases suddenly, the water will be driven into the outer sealing leg to a height sufficient to balance the pressure in the conduit.

Since the water-seal expansion joints, just described, are exposed to severe operating conditions, they must be made of stainless steel and are, therefore, rather expensive items of equipment. As the demand rises for protection of the environment, calling for ever cleaner industrial operations, the removal of more of the solid matter entrained in gases is required before they can be discharged into the atmosphere. In order to increase the effectiveness of the venturi-scrubber, the pressure in the gas conduit is increased which results in a higher gas velocity and a greater pressure drop in the throat of the device. Higher pressure in the conduit makes it necessary to increase the length of the sealing leg of the expansion joint and thus increases the cost and space requirements for the device. There is, accordingly, a real need for a water-seal expansion joint of a modest size and cost for use with a venturi scrubber.

It is an object of the invention to provide an improved water-seal expansion joint for use with a venturi scrubber.

It is another object of this invention to provide an improved water-seal expansion joint wherein the sealing water is employed to enhance the operation of the venturi scrubber.

Other objects and advantages of the invention will become apparent from the following description taken in conjunction with the accompanying drawings in which:

FIG. 1 is a view in elevation of an installation incorporating a venturi scrubber provided with a water-seal expansion joint for treating the off-gases of a fluid bed waste incineration reactor, FIG. 2 is a detail view in section of one form of the water-seal expansion joint in accordance with the invention, and FIG. 3 is a view in section of another form of the expansion joint in accordance with the invention.

Generally speaking, the present invention contemplates the location of a water-seal expansion joint immediately proximate the throat of a venturi scrubber to take advantage of the low pressure prevailing in that region. A positive seal is provided by continuously flowing water into the seal and injecting overflow water from the seal into the throat region of the venturi scrubber.

Referring now to FIG. 1, there is disclosed a water-seal expansion joint and venturi scrubber 20 vertically positioned in the conduit between a fluid bed waste incinerator reactor 10 and a scrubber 50 of the impingement tray type. It will be noted that the venturi scrubber is vertically disposed between the conduit sections 12 and 15 to receive the off-gases of the reactor 10 through the conduit 11 and to pass on the treated gases through the horizontal conduit 17 into the scrubber 50.

Turning now to FIG. 2, the down-coming gas conduit 12 joins the conduit section 21 which has a horizontal port 22 through which a water line 23 extends to feed a spray nozzle 24. The conduit section 21 extends into the convergent conical conduit member 27 which has at its upper end a circumferential flange 26 which is welded or otherwise joined to the conduit 21. The flange 26 also defines an annular region 29 about the lower end of the conduit 21 into which conduits 28 discharge water, preferentially in a tangential direction. The apex of the conical conduit member 27 terminates at the lower extremity thereof in a cylindrical venturi throat member 34. Spaced from this venturi inlet throat eliment or member 34 and in surrounding relation thereto is a cylindrical member or weir 31 which at its upper end is fixed, by welding or by other suitable means, in sealing relation to the outer surface of the conical member 27. Adjoining the conical member 27, with its depending cylindrical weir 31, is the sealing unit 35 which includes a central cylindrical outlet throat element or extension 36, defining a passage 44, and an outer cylindrical sealing wall 38 which is joined to the throat extension 36 by the bottom wall 37. The sealing wall 38, the bottom wall 37 and the throat extension 36 form an annular sealing channel or trough 39 surrounding the passage 44 at the upper end thereof. In assembled relation, as seen in FIG. 2, the venturi throat member 34 depending from the apex of the conical member 27 extends into the throat extension 36 of the sealing unit 35. The cylindrical weir of the conical member 27 extends well into the sealing channel 39 at the upper end of the sealing member 35. The sealing wall 38 extends upwardly substantially higher than the throat extension 36 and is concentric with the weir 31. Water conduits 33 feed into the sealing channel 39. The throat extension 36 of the sealing unit 35 is joined to the conduit 15 by divergent transition conduit 16 which mates the relatively small-diameter throat extension 36 with the conduit 15 of larger diameter.

In operation, the sealing channel is filled with water through the water conduits 33 and the water is allowed to continuously overflow at the top of the throat extension 36 to assure a positive seal. The throat extension 36 may be serrated as shown at 32, tending to stabilize the level of the seal water. It will be noted that the depending cylindrical weir 31 divides the sealing channel into an inner compartment 41 positioned between the throat extension 36 and the depending cylindrical weir 31, and an outer sealing leg 42 positioned between the cylindrical weir 31 and the outer sealing wall 38. Hot gases carrying entrained solids move downwardly in the direction of the arrow 13 through the conduit sections 12 and 21. Water may be sprayed through nozzle 24 to cool the hot gases, if desired. In the annular chamber 29 surrounding the lower end of the conduit section 21, water is tangentially introduced through the conduits 28, providing a cooling flow over the conical surface of the member 27 and the throat member 34 of the venturi, protecting the said surfaces from the high temperature gases. The gases, of course, move in the same direction through the conical section 27 and throat member 34 and atomize the water as it passes through the throat member 34 and passage 44. Water in compartment 41 of the sealing channel flows over the serrations 32 of the throat extension 36 into passage 44 where it, too, is atomized.

In the above described device, the location of the water seal expansion joint adjacent the throat region of the venturi scrubber, with the sealant water having access to and flowing into the low-pressure volume following the throat region, has the advantage that the seal is placed at the area of lowest pressure in the conduit. This is due to the fact that inherently the throat region of a venturi is a high-velocity, low pressure region, and further, that almost the entire pressure drop in the device occurs across the throat region. Substantial variations in the pressure within the conduit can occur and this water seal is adopted to sustain such changing pressures without breaking the seal. As can be seen in FIG. 2, the variations in pressure are immediately communicated to the surface of the sealant water in compartment 41 of the sealing channel. An increase in the pressure bearing on the sealant water in compartment 41 of the sealing channel is thus transmitted to the sealing leg 42 of the sealing channel, which it will be noted is open to atmospheric pressure. The water level in compartment 41 of the sealing channel will drop in response to the increase in pressure, while the water level in the sealing leg 42 will rise to balance the pressure in the region following the venturi throat. Since the excursions in pressure following the throat region of the venturi will be less extensive than in the high pressure region preceding the venturi throat, the sealing leg 42 need not be as long as would be the case if the seal were installed, say in conduit section 21, where the large fluctuations in pressure are more likely to blow out the sealant water.

In FIG. 3 there is illustrated a modified form of the water-seal expansion joint of this invention, particularly adopted for use where it is desirable to employ a venturi device having a relatively short throat region. It will also be noted that in this modified structure the conduit section 61 is illustrated as a metal conduit having a refractory lining 62. This structure has the advantage that a refractory lined conduit does not require a flow of cooling water over the interior surface thereof to protect it from the hot gases. The conical convergent section 67 of the venturi is quite similar to that illustrated in FIG. 2, but it will be noted that the throat member 69 of the venturi is of an abbreviated length. The throat extension 76 cooperating with the throat member 69 has accordingly been moved upwardly so that the serrated edge 72 at the upper end of the throat extension 76 is in surrounding relation to the venturi throat member 69. Since the vertical portion 78 of the sealing wall would be relatively short in this modification, the upper end of this wall is flared outwardly to form a conical portion 79 which is essentially parallel to the conical portion of the venturi convergent inlet 67. Accordingly, sudden increases in pressure within the throat extension 76 are balanced by fluid moving upwardly in the sealing leg 82, and if necessary, into the region defined by the flared portion 79.

For the purpose of illustrating the advantages of the invention to those skilled in the art, the following example is given:

EXAMPLE

Using the system illustrated in FIGS. 1 and 2, the off-gases of the reactor amount to 3600 scfm (cubic feet per minute at standard conditions of temperature and pressure) and contain from about 12 grains/scf (standard cubic feet) to about 15 grains/scf of solid particulate matter having a size range of from 100 mesh to 0.5 microns. The diameter of the downcoming conduit is slightly over 3 feet while the venturi throat member has a diameter of approximately 10 inches. The outside sealing wall of the water-seal expansion joint is approximately 2½ feet in height and has a diameter of approximately 3 feet. The depth of the water in the expansion joint is just over 10 inches and a flow of sealing water is maintained which amounts to 2 gallons per minute. In addition, approximately 50 gallons per minute of quench water and scrubbing water are introduced into the conduit just before the inlet of the venturi. The venturi scrubber illustrated is quite effective in removing solid particulate matter, the gas leaving the venturi having a solids content of approximately 0.05 grains/scf. The water seal is entirely effective in sealing the joint and is capable of handling pressure fluctuations in the region following the venturi throat amounting to from 0.3 to 1.5 psi.

On the particular installation described in the above example, it should be noted that had the water-seal expansion joint been installed in the conduit proper, ahead of the venturi throat rather than immediately proximate the venturi throat, the height of the sealing wall would have had to be at least 6 feet due to the high pressure prevailing in that region.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A water-seal expansion joint in a vertically oriented venturi scrubber, said scrubber having an upper convergent inlet section and a lower divergent outlet section and a throat region therebetween, the said sections having cooperating cylindrical throat elements which overlap in said throat region but are not in contact, said inlet section having a weir sealed thereto and in spaced surrounding relation to said inlet throat element, said outlet throat element surrounding and spaced from said inlet throat element and positioned between said inlet throat element and said weir, an annular sealing channel located about the end of said outlet throat element and defined by an outer sealing wall, said outlet throat element and a bottom wall, said outer sealing wall being generally concentric with said weir, said weir extending into the channel short of said bottom wall to divide said annular channel into an inner compartment in communication with said venturi throat region and an outer compartment which is exposed to atmospheric pressure, the said compartments being in fluid communication.

2. The water-seal expansion joint of claim 1 having means for providing a continuous flow of water through said annular channel and discharging into said venturi throat region.

3. The water-seal expansion joint of claim 2 wherein said outer compartment can accommodate a higher water level than said inner compartment to balance pressure fluctuations in said throat region.

4. A water-seal expansion joint in a vertically oriented venturi scrubber, said venturi scrubber comprising a conical inlet section and a conical outlet section for conducting gases under treatment, said water-seal expansion joint comprising a venturi throat region between said inlet and outlet sections having an inlet throat conduit connected to the conical inlet section and an outlet throat conduit connected to the conical outlet section, said inlet throat conduit extending into without contacting said outlet throat conduit, a water-filled channel surrounding the end of said outlet throat conduit, a weir concentrically mounted with respect to said inlet conduit on said conical inlet section and extending into said channel to a level below the surface of the water in said channel but above the bottom of the channel.

* * * * *